(12) United States Patent
Brown et al.

(10) Patent No.: US 8,515,127 B2
(45) Date of Patent: Aug. 20, 2013

(54) MULTISPECTRAL DETECTION OF PERSONAL ATTRIBUTES FOR VIDEO SURVEILLANCE

(75) Inventors: Lisa M. Brown, Pleasantville, NY (US); Rogerio S. Feris, White Plains, NY (US); Arun Hampapur, Norwalk, CT (US); Daniel A. Vaquero, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 584 days.

(21) Appl. No.: 12/845,121

(22) Filed: Jul. 28, 2010

(65) Prior Publication Data

US 2012/0027249 A1   Feb. 2, 2012

(51) Int. Cl.
*G06K 9/00* (2006.01)

(52) U.S. Cl.
USPC .......................................... 382/103

(58) Field of Classification Search
None
See application file for complete search history.

(56) References Cited

U.S. PATENT DOCUMENTS

| | | | |
|---|---|---|---|
| 5,870,138 A | 2/1999 | Smith et al. | |
| 6,549,913 B1 | 4/2003 | Murakawa | |
| 6,608,930 B1 | 8/2003 | Agnihotri et al. | |
| 6,795,567 B1 | 9/2004 | Cham et al. | |
| 6,885,761 B2 | 4/2005 | Kage | |
| 6,920,236 B2 | 7/2005 | Prokoski | |
| 6,967,674 B1 | 11/2005 | Lausch | |
| 7,006,950 B1 | 2/2006 | Greiffenhagen et al. | |
| 7,257,569 B2 | 8/2007 | Elder et al. | |
| 7,274,803 B1 | 9/2007 | Sharma et al. | |
| 7,277,891 B2 | 10/2007 | Howard et al. | |
| 7,355,627 B2 | 4/2008 | Yamazaki et al. | |
| 7,382,894 B2 | 6/2008 | Ikeda et al. | |
| 7,391,900 B2 | 6/2008 | Kim et al. | |
| 7,395,316 B2 | 7/2008 | Ostertag et al. | |

(Continued)

FOREIGN PATENT DOCUMENTS

DE   19960372 A1   6/2001
FR   2875629 A1   3/2006

(Continued)

OTHER PUBLICATIONS

Ronfard et al., Learning to Parse Pictures of People, Lecture Notes in Computer Science—LNCS vol. 2353, Jan. 1, 2002, pp. 700-714.

(Continued)

*Primary Examiner* — Nancy Bitar
(74) *Attorney, Agent, or Firm* — Ryan, Mason & Lewis, LLP

(57) ABSTRACT

Techniques for detecting an attribute in video surveillance include generating training sets of multispectral images, generating a group of multispectral box features comprising receiving input of a detector size of a width and height, a number of spectral bands in the multispectral images, and integer values representing a minimum and maximum width and height of multispectral box features, fixing a feature width and height, generating feature building blocks with the fixed width and height, placing a feature building block at a same location for each spectral band level, and enumerating combinations of the feature building blocks through each spectral level until all sizes within the integer values have been covered, and wherein each combination determines a multispectral box feature, using the training sets to select multispectral box features to generate a multispectral attribute detector, and using the multispectral attribute detector to identify a location of an attribute in video surveillance.

22 Claims, 11 Drawing Sheets

(56) References Cited

U.S. PATENT DOCUMENTS

| | | | |
|---|---|---|---|
| 7,406,184 B2 | 7/2008 | Wolff et al. | |
| 7,450,735 B1 | 11/2008 | Shah et al. | |
| 7,460,149 B1 | 12/2008 | Donovan et al. | |
| 7,526,102 B2 | 4/2009 | Ozer | |
| 7,974,714 B2 * | 7/2011 | Hoffberg | 700/94 |
| 8,004,394 B2 * | 8/2011 | Englander | 340/433 |
| 8,208,694 B2 | 6/2012 | Jelonek et al. | |
| 8,411,908 B2 * | 4/2013 | Ebata et al. | 382/115 |
| 2003/0120656 A1 | 6/2003 | Kageyama et al. | |
| 2005/0013482 A1 | 1/2005 | Niesen | |
| 2005/0162515 A1 | 7/2005 | Venetianer et al. | |
| 2006/0165386 A1 | 7/2006 | Garoutte | |
| 2006/0184553 A1 | 8/2006 | Liu et al. | |
| 2006/0285723 A1 | 12/2006 | Morellas et al. | |
| 2007/0052858 A1 | 3/2007 | Zhou et al. | |
| 2007/0053513 A1 | 3/2007 | Hoffberg | |
| 2007/0122005 A1 | 5/2007 | Kage et al. | |
| 2007/0126868 A1 | 6/2007 | Kiyohara et al. | |
| 2007/0177819 A1 | 8/2007 | Ma et al. | |
| 2007/0183763 A1 * | 8/2007 | Barnes et al. | 396/55 |
| 2007/0237355 A1 | 10/2007 | Song et al. | |
| 2007/0237357 A1 | 10/2007 | Low | |
| 2007/0294207 A1 * | 12/2007 | Brown et al. | 707/1 |
| 2008/0002892 A1 | 1/2008 | Jelonek et al. | |
| 2008/0080743 A1 | 4/2008 | Schneiderman et al. | |
| 2008/0122597 A1 * | 5/2008 | Englander | 340/433 |
| 2008/0123968 A1 | 5/2008 | Nevatia et al. | |
| 2008/0201282 A1 | 8/2008 | Garcia et al. | |
| 2008/0211915 A1 | 9/2008 | McCubbrey | |
| 2008/0218603 A1 | 9/2008 | Oishi | |
| 2008/0232651 A1 | 9/2008 | Woo | |
| 2008/0252722 A1 | 10/2008 | Wang et al. | |
| 2008/0252727 A1 | 10/2008 | Brown et al. | |
| 2008/0269958 A1 | 10/2008 | Filev et al. | |
| 2008/0273088 A1 | 11/2008 | Shu et al. | |
| 2008/0317298 A1 | 12/2008 | Shah et al. | |
| 2009/0046153 A1 | 2/2009 | Chen et al. | |
| 2009/0060294 A1 | 3/2009 | Matsubara et al. | |
| 2009/0066790 A1 | 3/2009 | Hammadou | |
| 2009/0074261 A1 | 3/2009 | Haupt et al. | |
| 2009/0097739 A1 | 4/2009 | Rao et al. | |
| 2009/0174526 A1 | 7/2009 | Howard et al. | |
| 2009/0261979 A1 * | 10/2009 | Breed et al. | 340/576 |
| 2009/0295919 A1 * | 12/2009 | Chen et al. | 348/143 |
| 2010/0106707 A1 | 4/2010 | Brown et al. | |
| 2010/0150447 A1 | 6/2010 | GunasekaranBabu et al. | |
| 2011/0087677 A1 | 4/2011 | Yoshio et al. | |
| 2012/0039506 A1 | 2/2012 | Sturzel et al. | |

FOREIGN PATENT DOCUMENTS

| | | | |
|---|---|---|---|
| JP | 2004070514 A | 3/2004 | |
| WO | WO 2009117607 A1 | 9/2009 | |
| WO | 2009133667 A1 | 11/2009 | |
| WO | 2010023213 A1 | 3/2010 | |

OTHER PUBLICATIONS

Li-Jia Li et al., Towards Total Scene Understanding: Classification, Annotation and Segmentation in an Automatic Framework, Computer Vision and Pattern Recognition, 2009, CVPR 2009. IEEE, Piscataway, NJ, USA, Jun. 20, 2009, pp. 2036-2043.
Szelisky, Computer Vision: Algorithms and Applications, Jan. 1, 2011, Springer, pp. 615-621.
Marr, Vision, Jan. 1, 1982, Freeman, pp. 305-313.
Ramanan, Part-Based Models for Finding People and Estimating Their Pose, in: Thomas B. Moeslund et al., Visual Analysis of Humans, Jan. 1, 2011, Springer, pp. 1-25.
Zhu et al., A Stochastic Grammar of Images, Jan. 1, 2007, Now Publishers, pp. 259-362.
Vaquero et al., Chapter 14: Attribute-Based People Search, in: Yunqian Ma et al. Intelligent Video Surveillance: Systems and Technology, Jan. 1, 2009, pp. 387-405.
Feris, Chapter 3, Case Study: IBM Smart Surveillance System, in: Yunqian Ma et al., Intelligent Video Surveillance: System and Technology, Jan. 1, 2009, pp. 47-76.
Nowozin et al., Structured Learning and Prediction in Computer Vision, Jan. 1, 2011, Now Publishers, pp. 183-365.
Wu, Integration and Goal-Guided Scheduling of Bottom-up and Top-Down Computing Processes in Hierarchical Models, UCLA Jan. 1, 2011.
Lin L et al., A Stochastic Graph Grammar for Compositional Object Representation and Recognition, Pattern Recognition, Elsevier, GB, vol. 42, No. 7, Jul. 1, 2009, pp. 1297-1307.
Yang et al., Evaluating Information Contributions of Bottom-up and Top-down Processes, Computer Vision, 2009 IEEE, Piscataway, NJ, USA, Sep. 29, 2009, pp. 1042-1049.
Tan et al., Enhanced Pictorial Structures for Precise Eye Localization Under Incontrolled Conditions, Computer Vision and Pattern Recognition, 2009. CVPR 2009. IEEE, Piscataway, NJ, USA Jun. 20, 2009, pp. 1621-1628.
Ioffe et al., Probabilistic Methods for Finding People, International Journal of Computer Vision, Kluwer Academic Publishers, Norwell, US, vol. 43, No. 1, Jun. 1, 2001, pp. 45-68.
Ronfard et al. Learning to Parse Pictures of People, Jan. 1, 2002, pp. 1-15.
Indexing and Searching According to Attributes of a Person, pp. 1-35.
Jiang et al. View synthesis from Infrared-visual fused 3D model for face recognition, Fifth Intl. Conference on Information, Communications and Signal Processing, pp. 177-180, 2005.
Gundimada et al. Feature Selection for Improved Face Recognition in Multisensor Images. In R. Hammoud, B. Abidi and M. Abidi, editors. Face Biometrics for Personal Identification, Signals and Communication Technology, pp. 109-120, Springer Berlin Heidelberg, 2007.
Tian et al. Real-time Detection of Abandoned and Removed Objects in Complex Environments.
Viola et al. Rapid Object Detection using a Boosted Cascade of Simple Features. 2001.
Viola and Jones. Robust Real-Time Object Detection. 2001.
Conaire et al. Multispectral Object Segmentation and Retrieval in Surveillance Video.
Tseng et al. Mining from time series human movement data. 2006.
Raskar et al. Image Fusion for Context Enhancement and Video Surrealism. 2004.
Abidi et al. Survey and Analysis of Multimodal Sensor Planning and Integration for Wide Area Surveillance. 2008.
Kong et al. Recent advances in visual and infrared face recognition—a review. 2005.
Wu et al, Fast Rotation Invariant Multi-View Face Detection Based on Real Adaboost.
Boyle et al. The Language of Privacy: Learning from Video Media Space Analysis and Design.
Milian. Virtual Interviews.
Fukuda et al. Visual Surveillance System with Multiple Cameras in Wide Area Environment.
Petrushin et al. Multiple Sensor Integration for Indoor Surveillance.
Trease et al. Unstructured data analysis of streaming video using parallel, high-throughput algorithms.
Hampapur et al. Multi-scale Tracking for Smart Video Surveillance. IEEE Transactions on Signal Processing, vol. 22, No. 2, Mar. 2005.
Kang et al.; Continuous Tracking within and Across Camera Streams.
Dalal et al., "Histograms of Oriented Gradients for Human Detection", CVPR 2005, San Diego, USA.
Comaniciu et al., "Real-Time Tracking of Non-Rigid Objects Using Mean Shift", CVPR 2000, Hilton Head, SC, USA.
U.S. Appl. No. 12/845,119, filed Jul. 28, 2010, titled, Attribute Based Person Tracking Across Multiple Cameras.
U.S. Appl. No. 12/845,116, filed Jul. 28, 2010, titled, Facilitating People Search in Video Surveillance.
Mittal et al, M2Tracker: A Multi-View Approach to Segmenting and Tracking People in a Cluttered Scene, International Journal of Computer Vision, vol. 51, Issue 3, pp. 189-203, Feb. 2003.
Park et al., Simultaneous Tracking of Multiple Body Parts of Interacting Persons, Computer Vision and Image Understanding, vol. 102, Issue 1, pp. 1-21, 2006.
Chibelushi et al., Facial Expression Recognition: A Brief Tutorial Overview, pp. 1-5, 2002.

Feris et al, Detection and Tracking of Facial Features in Video Sequences, Lecture Notes in Computer Science, vol. 1793, Proceedings of the Mexican International Conference on.

Xu et al., Pedestrian Detection with Local Feature Assistant, Control and Automation, 2007, ICCA 2007, IEEE International Conference on May 30-Jun. 1, 2007, pp. 1542-1547, 2007.

Mohan et al., Example-Based Object Detection in Images by Components, IEEE Transaction of Pattern Analysis and Machine Intelligence, vol. 23, No. 4, pp. 349-361, Apr. 2001.

Felzenszwalb et al., Pictorial Structures for Object Recognition, International Journal of Computer Vision (IJCV), pp. 1-42, Jan. 2005.

Ramanan et al., Strike a Pose: Tracking People by Finding Stylized Poses, Computer Vision and Pattern Recognition (CVPR), San Diego, CA, Jun. 2005.

Tran et al., Configuration Estimates Improve Pedestrian Finding, National Information Processing Systems Foundation, 2007.

Tsochantaridis et al., Large Margin Methods for Structured and Interdependent Output Variables, Journal of Machine Learning Research (JMLR), Sep. 2005.

Naive Bayes Classifier, Wikipedia, http://en.wikipedia.org/wiki/Naive_Bayes_classifier, Jul. 27, 2010, 7 pages.

KaewTrakuPong et al., A Real Time Adaptive Visual Surveillance System for Tracking Low-Resolution Colour Targets in Dynamically Changing Scenes, Image and Vision Computing, vol. 21, Issue 1-0, pp. 913-929, 2003.

Schmidt, Automatic Initialization for Body Tracking Human Upper Body Motions, 3rd International Conference on Computer Vision Theory and Applications (VISAPP), Jan. 22, 2008.

Bi et al., Human Body Segmentation Based on Adaptive Feature Selection in Complex Situations, pp. 1-9.

Lao et al., Fast Detection and Modeling of Human-Body Parts from Monocular Video, F.J. Perales and R.B. Fisher (Eds.): AMDO 2008, LNCS 5098, pp. 380-389, 2008.

Samangooei et al., The Use of Semantic Human Description as a Soft Biometric, Biometrics: Theory, Applications and Systems, 2008. BTAS 2008. 2nd IEEE International Conference.

Park et al., Multiresolution Models for Object Detection, in Proceedings of the 11th European Conference on Computer Vision: Part IV, pp. 241-254 (2010).

U.S. Appl. No. 12/845,095, filed Jul. 28, 2010, titled, Semantic Parsing of Objects in Video.

Mohan et al., Example-Based Object Detection in Images by Components, IEEE Transactions on Pattern Analysis and Machine Intelligence, vol. 23, No. 4, Apr. 2001, pp. 349-361.

International Search Report for PCT/EP2011/062910 dated Oct. 6, 2011.

* cited by examiner

MULTISPECTRAL DETECTION OF PERSONAL ATTRIBUTES FOR VIDEO SURVEILLANCE

CROSS-REFERENCE TO RELATED APPLICATIONS

The present application is related to U.S. patent application entitled "Attribute-Based Person Tracking Across Multiple Cameras," Ser. No. 12/845,119 and filed concurrently herewith, the disclosure of which is incorporated by reference herein in its entirety.

Additionally, the present application is related to U.S. patent application entitled "Facilitating People Search in Video Surveillance," Ser. No. 12/845,116, and filed concurrently herewith, the disclosure of which is incorporated by reference herein in its entirety.

Also, the present application is related to U.S. patent application entitled "Semantic Parsing of Objects in Video," Ser. No. 12/845,095, and filed concurrently herewith, the disclosure of which is incorporated by reference herein in its entirety.

FIELD OF THE INVENTION

Embodiments of the invention generally relate to information technology, and, more particularly, to video surveillance.

BACKGROUND OF THE INVENTION

Challenges exist in detecting fine-grained personal attributes in surveillance videos. Existing approaches include using object detectors trained from large amounts of data using machine learning techniques. However, typical surveillance conditions (for example, low resolution images, pose and lighting variations) lead to cases where machine learning techniques fail because the attributes of interest cannot be reliably identified from images due to changes in appearance caused by the surveillance conditions (for example, shadows that look like beards, or eyeglasses that cannot be identified due to poor resolution).

SUMMARY OF THE INVENTION

Principles and embodiments of the invention provide techniques for multispectral detection of attributes for video surveillance. An exemplary method (which may be computer-implemented) for detecting an attribute in video surveillance, according to one aspect of the invention, can include steps of generating training sets of multispectral images, generating a group of multispectral box features comprising receiving input of a detector size of a width and height, a number of spectral bands in the multispectral images, and integer values representing a minimum and maximum width and height of multispectral box features, fixing a feature width and height, generating feature building blocks with the fixed width and height, placing a feature building block at a same location for each spectral band level, and enumerating combinations of the feature building blocks through each spectral level until all sizes within the integer values have been covered, and wherein each combination determines a multispectral box feature, using the training sets to select multispectral box features to generate a multispectral attribute detector, and using the multispectral attribute detector to identify a location of an attribute in video surveillance.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps.

Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Principles of the invention include multispectral detection of personal attributes for video surveillance. As described herein, one or more embodiments of the invention include using multispectral imagery to reliably detect fine-grained personal attributes (for example, facial hair type, nose shape, hairstyle, short or long sleeved shirts, eyewear type, hat shape, etc.) in surveillance videos. Additionally, in one or more embodiments of the invention, features in the visible domain are combined with features in other wavelengths (such as, for example, thermal infrared) to design finegrained attribute detectors that are robust to variations in lighting and lack of resolution.

As detailed herein, multiple images of a scene can be simultaneously captured from the same point of view, where each image corresponds to a different portion of the electromagnetic spectrum. By way of example and not limitation, consider two images, one from a standard color camera, and another from a thermal infrared (IR) camera. The simultaneous capture of both visible and IR images from the same point of view can be achieved, for example, by using a "cold mirror," which reflects the visible light spectrum while transmitting infrared wavelengths, by arranging the two cameras and the mirror so that their optical axes coincide. Additionally, in one or more embodiments of the invention, features from both images are extracted and combined, for example, using adaptive boosting (Adaboost) learning, to design finegrained attribute detectors.

Figure 1:
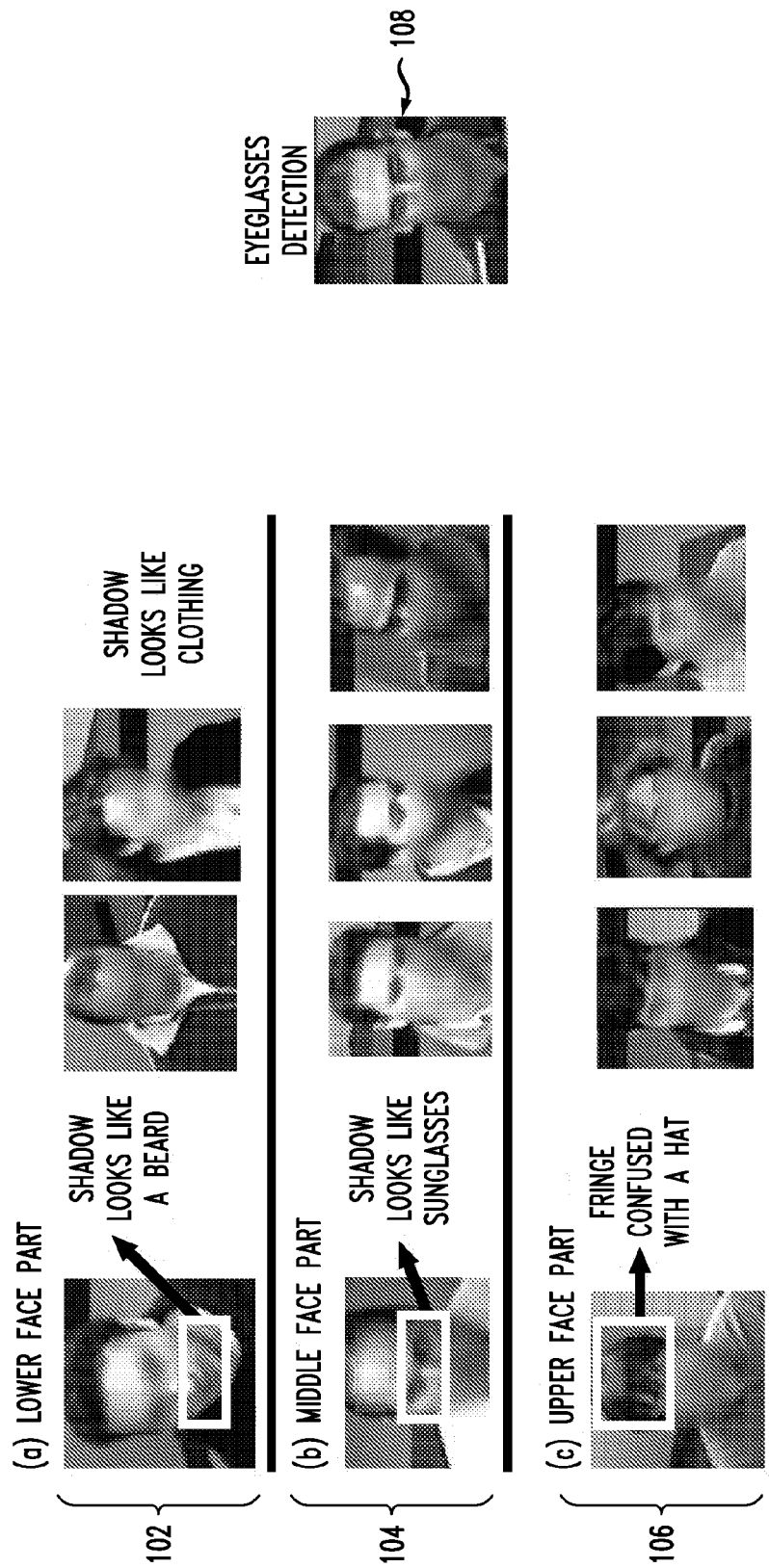
FIG. 1 is a diagram illustrating illumination effects (shadows) lead to errors in the facial feature detection, according to an embodiment of the invention.

FIG. 1 is a diagram illustrating illumination effects (shadows) lead to errors in the facial feature detection, according to an embodiment of the invention. By way of illustration, FIG. 1 depicts examples of failure cases in lower face feature detection 102, middle face feature detection 104, upper face feature detection 106, and eyeglasses detection 108 in typical surveillance conditions.

Lower face feature detection (as depicted by images 102 in FIG. 1) can be challenging because a shadow can look, for example, like a beard or mustache, or clothing can look like a beard. Middle face feature detection (as depicted by images 104 in FIG. 1) can be challenging because a shadow can look, for example, like sunglasses. Upper face feature detection (as depicted by images 106 in FIG. 1) can be challenging because fringe or bangs can be confused, for example, with a hat. Additionally, eyeglasses detection (as depicted by image 108 in FIG. 1) can be challenging, especially in low-resolution imagery, as the lenses are transparent and the frame can be invisible.

As such, one or more embodiments of the invention include using a camera that can capture multispectral images from the same viewpoint (thermal infrared image, visible image, etc.). For example, as described herein, a visible image and an IR image can be captured at the same time from the same point of view, using a cold mirror to reflect visible radiation while letting IR radiation go through. This provides, for a given captured frame, two (or, in other examples, more than two) images of a scene captured from the same point of view.

Figure 2:
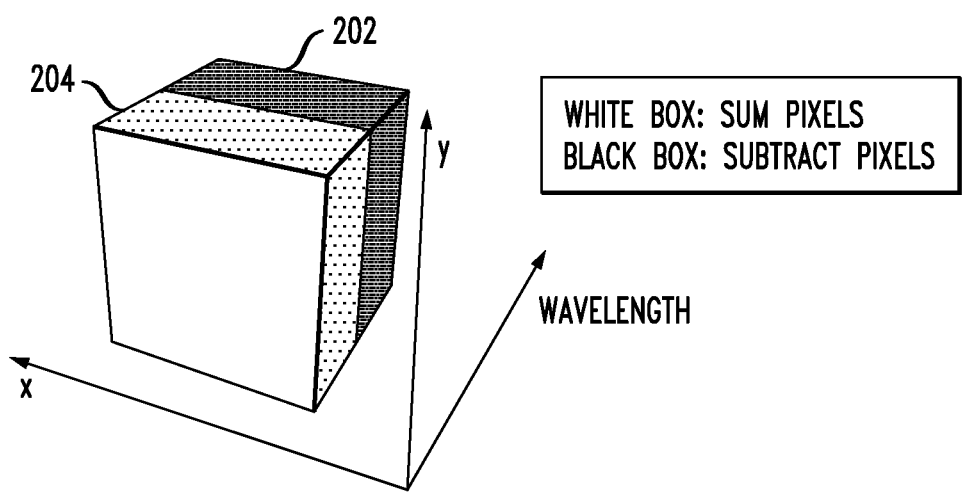
FIG. 2 is a diagram illustrating a multispectral box feature, according to an embodiment of the invention.

As also detailed herein, a multispectral box feature is defined as a sum of pixel values along regions in the threedimensional (3D) space given by a stack of captured images. Each region may have a positive or a negative sign, meaning that the pixel values in that region are either added or subtracted. Refer, for example, to FIG. 2 for an illustration.

FIG. 2 is a diagram illustrating a multispectral box feature, according to an embodiment of the invention. By way of illustration, FIG. 2 depicts black box 202, which includes subtract pixels, and white box 204, which includes sum pixels.

As these features combine pixels across different wavelengths (for example, visible domain, infrared, etc.), they are more robust to lighting effects and can also exploit increased contrast between skin/non-skin regions.

Figure 3:
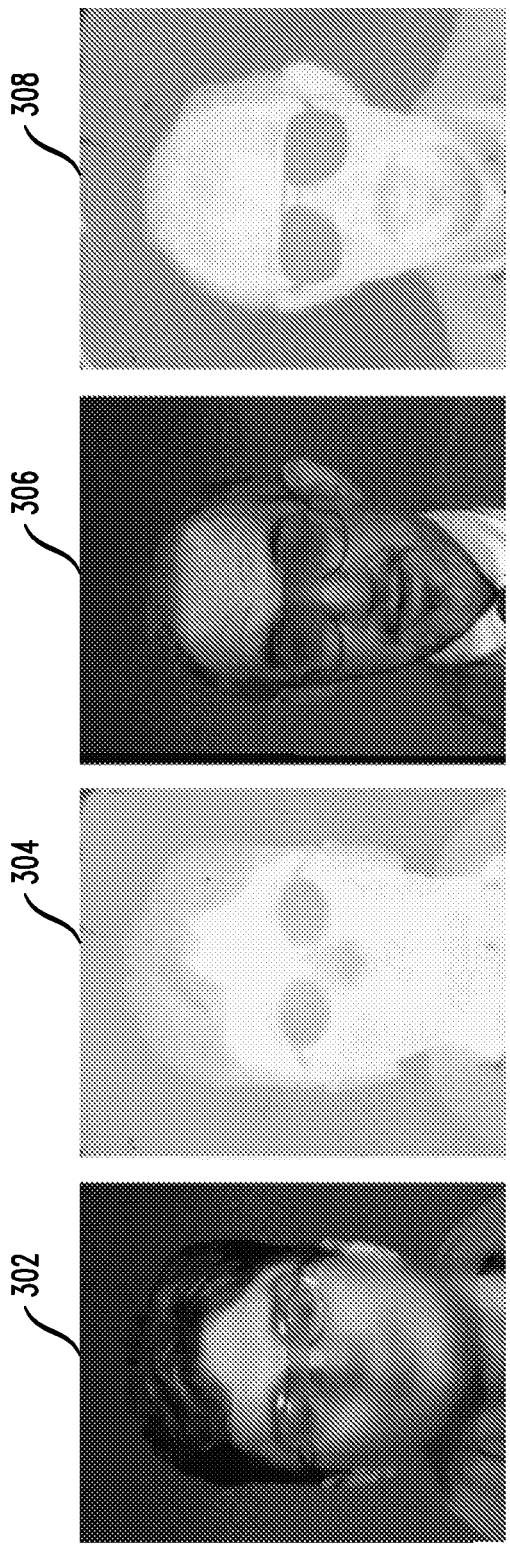
FIG. 3 is a diagram illustrating pairs of visible and/or thermal infrared images, according to an embodiment of the invention.

FIG. 3 is a diagram illustrating pairs of visible and/or thermal infrared images, according to an embodiment of the invention. By way of illustration, FIG. 3 depicts two pairs of visible and thermal IR images (pair 302 (visible) and 304 (thermal IR), and pair 306 (visible) and 308 (thermal IR)), illustrating example combinations for reliable detection of fine-grained attributes. As described herein, combining features from both images can improve the robustness of the attribute detectors. By way of example and not limitation, eyeglasses are clearly visible in the IR image, and beards are much less susceptible to illumination effects.

As illustrated in FIG. 3, one or more embodiments of the invention include using multispectral features. By way of example and not limitation, thermal IR can be used for eyeglasses detection as well as for minimizing illumination and clothing effects for facial hair detection (as the measured radiation is emitted rather than reflected).

Figure 4:
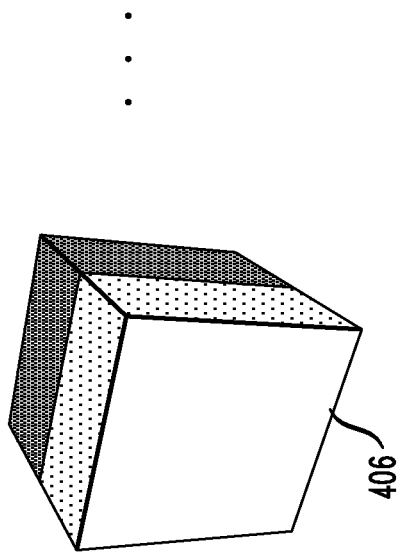
FIG. 4 is a diagram illustrating examples of different multispectral box features, according to an embodiment of the invention.
Figure 4:
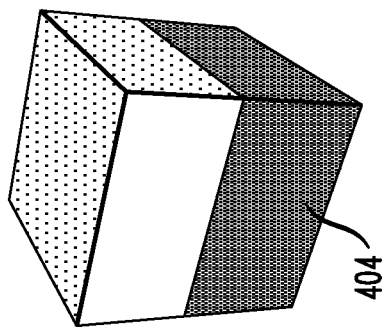
Figure 4:
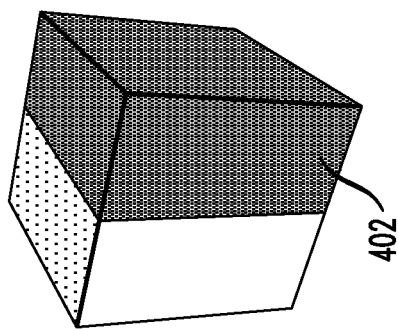

In one or more embodiments of the invention, there can be many configurations for multispectral features (for example, consider the variations in the possible rectangles, placed at different image positions). As illustrated in FIG. 4, one or more embodiments of the invention include selecting, among the huge pool of features, the ones that best discriminate the attributes of interest.

FIG. 4 is a diagram illustrating examples of different multispectral box features, according to an embodiment of the invention. By way of illustration, FIG. 4 depicts example multispectral box features 402, 404 and 406. As described herein, one or more embodiments of the invention include using Adaboost learning to select the multispectral box features that are more relevant for discrimination, given a set of training examples.

As also described herein, one or more embodiments of the invention provide techniques for attribute-based people searching based on learning of multispectral box features, and using the multispectral features and additional learning features (for example, Adaboost learning features).

An attribute-based people search based on learning of multispectral box features can include, by way of example, searching based on fine-grained personal attributes such as, for instance, facial hair type, nose shape, head type (bald, hair, wearing a hat, etc.), color of shirt and pants, eyewear type, etc. In one or more embodiments of the invention, Adaboost classifiers can be used to detect each feature (in the multispectral image domain). Further, in one or more embodiments of the invention, Adaboost classifiers can be used to detect each feature in a visible domain as a specific case of the multispectral domain which includes only the visible spectrum.

In learning multispectral box features, one or more embodiments of the invention can include using Adaboost learning to select the most discriminative features for detecting human parts and attributes in the visible and infrared domain. For example, for eyeglasses detection, the key selected features might come from boxes that have their white part in the visible domain and the black part in the infrared domain (as glasses become dark in this domain). Sunglasses could be discriminated from eyeglasses, by way of example, by selecting features from the visible domain. Attribute detectors can be designed using machine learning techniques (for example, Adaboost), which select, from a pool of features, the features that best represent the attributes to be extracted. This selection process can be based on a set of training examples, which includes images of the attribute to be detected and images where the attribute to be detected is not present.

Further, one or more embodiments of the invention can include using Adaboost to assemble multiple weak classifiers into one single strong classifier. Such techniques can include, for example, initializing sample weights and, for each cycle, finding a classifier that performs well on the weighted sample and increasing weights of misclassified examples. Accordingly, a weighted combination of classifiers can be returned, and in one or more embodiments of the invention, Adaboost can be used both to select features and train the classifier.

Figure 5:
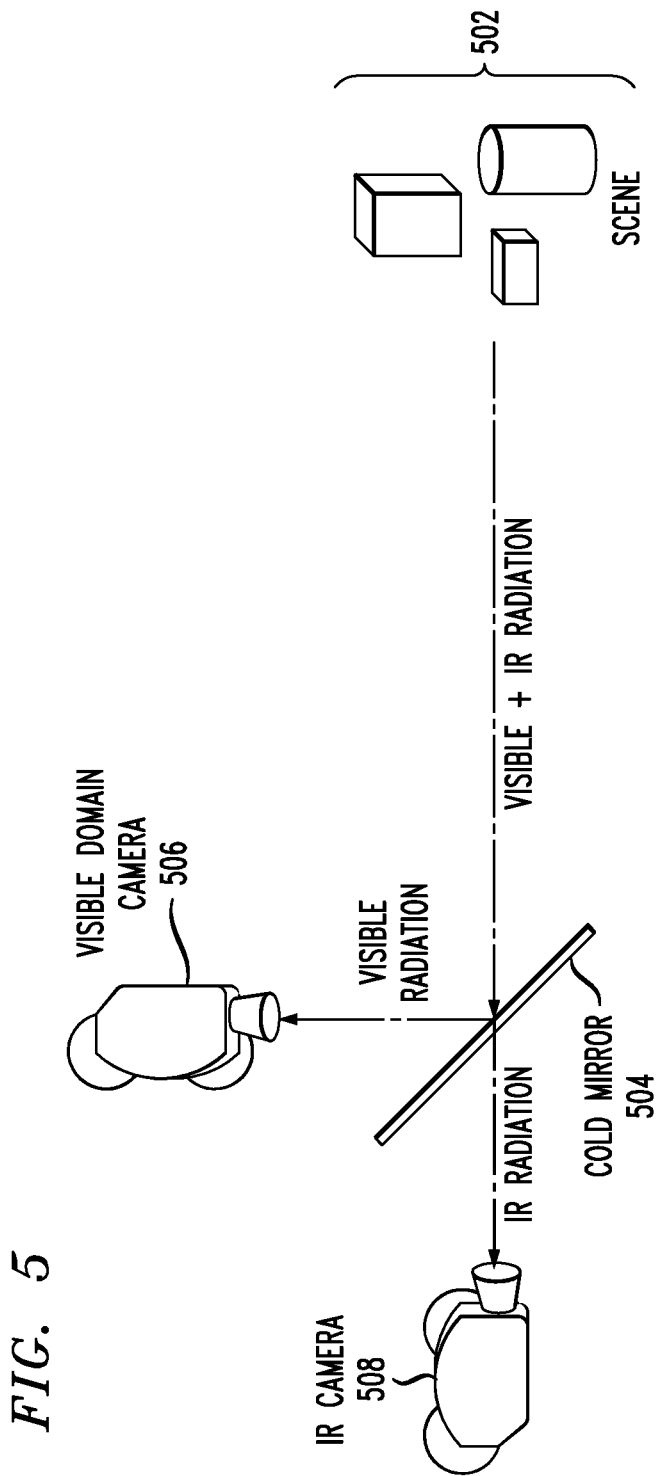
FIG. 5 is a block diagram illustrating an exemplary embodiment, according to an aspect of the invention.

FIG. 5 is a block diagram illustrating an exemplary embodiment, according to an aspect of the invention. By way of illustration, FIG. 5 depicts a scene 502 (including, for example, people, objects, etc.) which provides visible radiation as well as infrared (IR) radiation. FIG. 5 also depicts a cold mirror 504, which captures visible radiation and IR radiation at the same time and separates them, sending each to visible domain camera 506 and IR camera 508, respectively.

Figure 6:
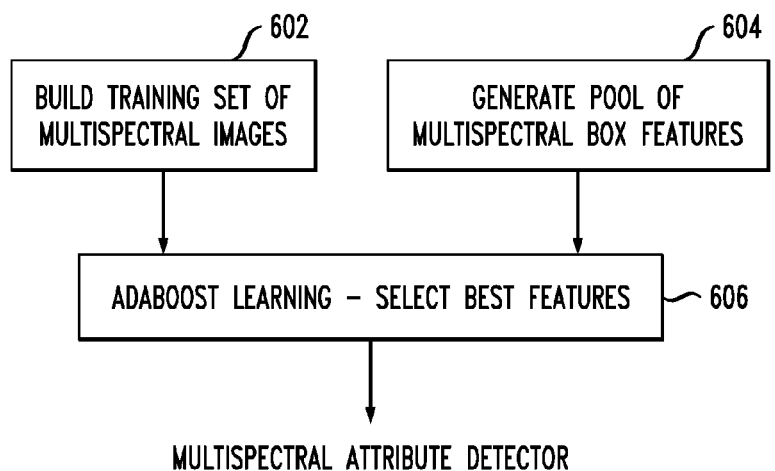
FIG. 6 is a flow diagram illustrating techniques for detecting attributes, according to an aspect of the invention.
Figure 6:
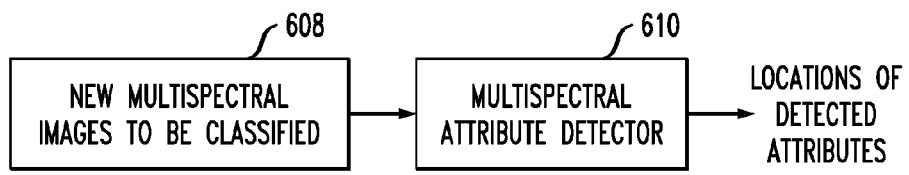

FIG. 6 is a flow diagram illustrating techniques for detecting attributes, according to an aspect of the invention. By way of illustration, FIG. 6 depicts a training stage and an application stage. In the training stage, step 602 includes building a training set of multispectral images (see, also, FIG. 8).

Step 604 includes generating a pool/group of multispectral box features. Given a detection size (width×height), there are a number of multispectral bands (d) in the multispectral images (for example, two if using visible and infrared (IR)). This forms a rectangular parallelepiped of size (width× height×d). Additionally, ($f_{min}$, $f_{max}$) indicates minimum feature size and maximum feature size, respectively.

For every location in the (width×height×d) volume and for every feature size in the ($f_{min}$, $f_{max}$) range, one or more embodiments of the invention include generating a multispectral box feature by enumerating all possible combinations of A-F features across different slices of the volume. Each slice corresponds to a different wavelength, totaling d slices. The resulting output includes a pool/group of multispectral box features.

As used herein, A-F indicate different configurations of features in only one of the possible wavelengths, where black areas mean "subtract pixels" and white areas mean "add pixels." By "stacking" features in A-F across multiple wavelengths, one or more embodiments of the invention obtain multispectral box features. Examples are illustrated in FIG. 2 and FIG. 4. For example, in FIG. 2, there is a feature "E" stacked on top of a feature "F." Additionally, FIG. 4 (402) depicts two features "A" stacked on top of each other, etc. Additionally, see, for example, FIG. 7.

Also within the training stage, step 606 includes selecting the most relevant features via Adaboost learning. Inputs include a positive and negative training set (see, FIG. 8) and a pool/group of multispectral box features. One or more embodiments of the invention can include using an algorithm to select the best features for discrimination between positive and negative examples. This results in an output of a multispectral attribute detector. Algorithms for selecting the best features for discrimination can include, by way of example, the design of a strong classifier based on Adaboost learning, which is obtained by combining one or more weak classifiers. By way of example only, example equations can be found in Viola and Jones, "Robust Real-Time Object Detection," Second International Workshop On Statistical and Computational Theories of Vision—Modeling, Learning, Computing, and Sampling, Canada, July 2001.

In the application stage, step 608 includes classifying new multispectral images. Additionally, step 610 includes using the multispectral attribute detector to identify the locations of detected attributes. Inputs for the application stage include a multispectral image to be classified and a multispectral attribute detector. For every location and scale of a multispectral image, one or more embodiments of the invention include applying the multispectral attribute detector. This results in an output that includes a 1 (one) if the attribute is detected, and a 0 (zero) otherwise. As noted herein, the final output of the application stage includes locations of detected attributes (corresponding to 1s).

Figure 7:
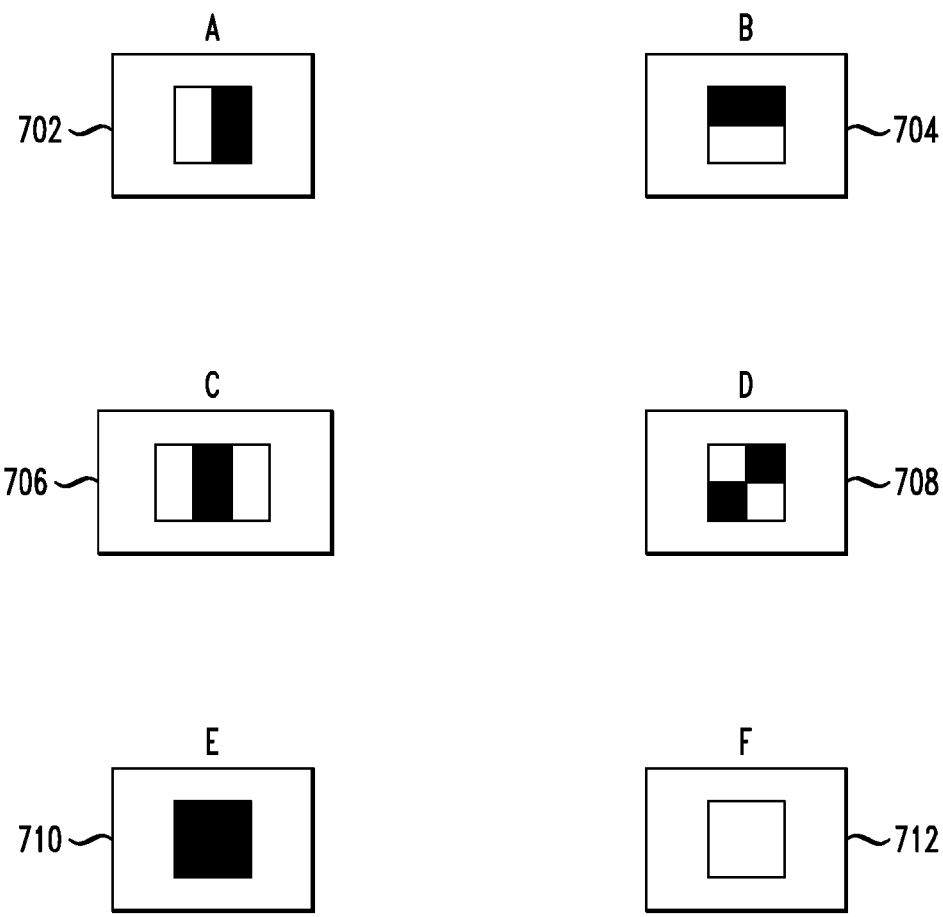
FIG. 7 is a diagram illustrating feature types used as building blocks for multispectral box features, according to an aspect of the invention.

FIG. 7 is a diagram illustrating feature types used as building blocks for multispectral box features, according to an aspect of the invention. By way of illustration, FIG. 7 depicts feature A (702), feature B (704), feature C (706), feature D (708), feature E (710) and feature F (712). As depicted in FIG. 7, the shaded regions indicate subtracting pixels and the unshaded regions indicate adding pixels.

Figure 8:
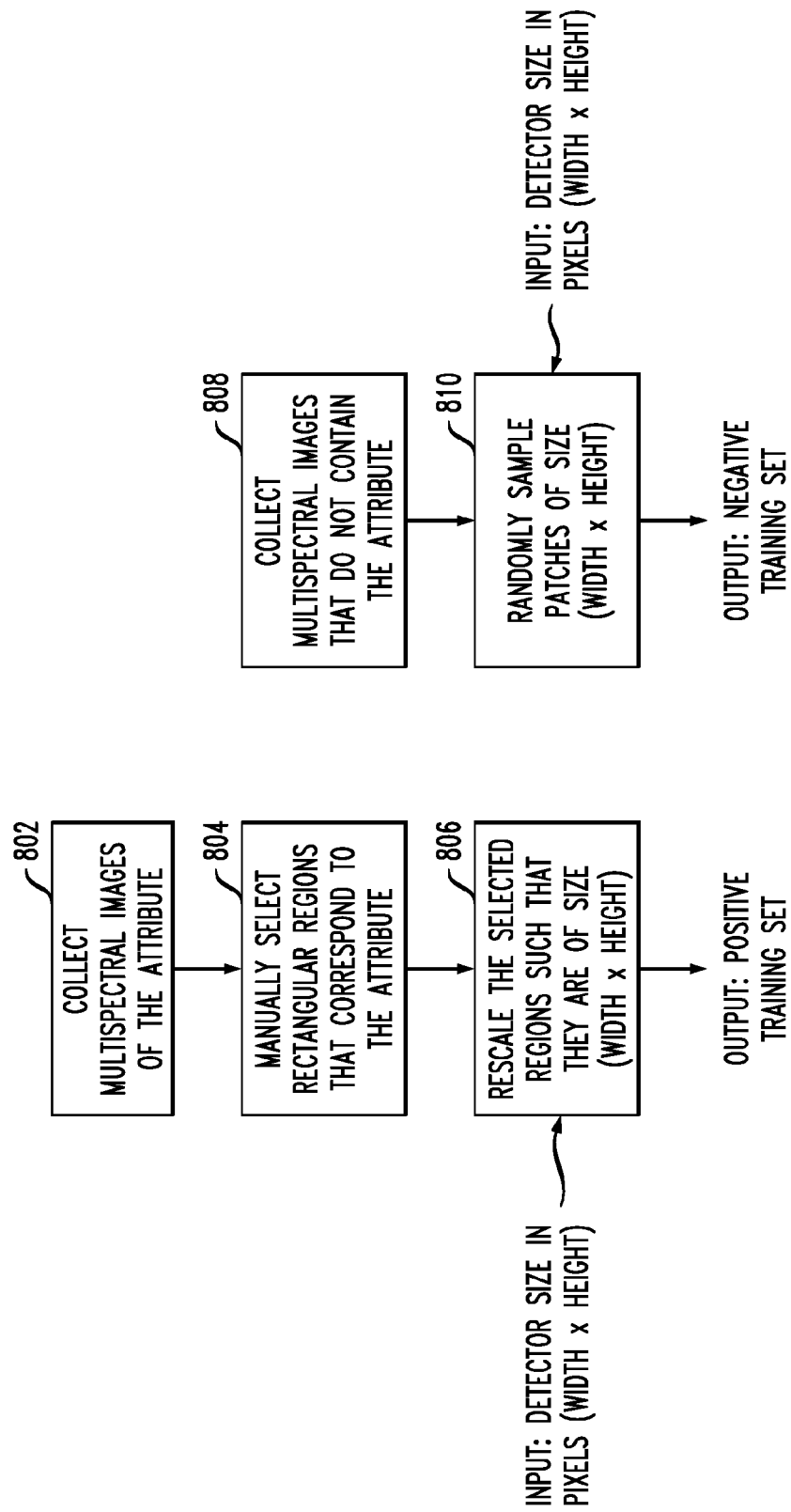
FIG. 8 is a flow diagram illustrating techniques for building a training set of multispectral images, according to an aspect of the invention.

FIG. 8 is a flow diagram illustrating techniques for building a training set of multispectral images, according to an aspect of the invention. For a given attribute (for example, eyeglasses) for which a detector is to be trained, the input can include a detector size in pixels (width×height). Step 802 includes collecting multispectral images of the attribute (for example, eyeglasses). Step 804 includes manually selecting rectangular regions that correspond to the attribute. Also, step 806 includes resealing the selected regions such that they are of size (width×height). The output of these steps includes a positive training set.

As also depicted in FIG. 8, step 808 includes collecting multispectral images that do not contain the attribute (for example, anything that is not eyeglasses). Further, step 810 includes randomly sampling patches of size (width×height). The output of these steps includes a negative training set. As noted in FIG. 8, (width×height) is an input only to steps 806 and 810. Steps 802, 804, and 808 do not make use of these parameters.

Figure 9:
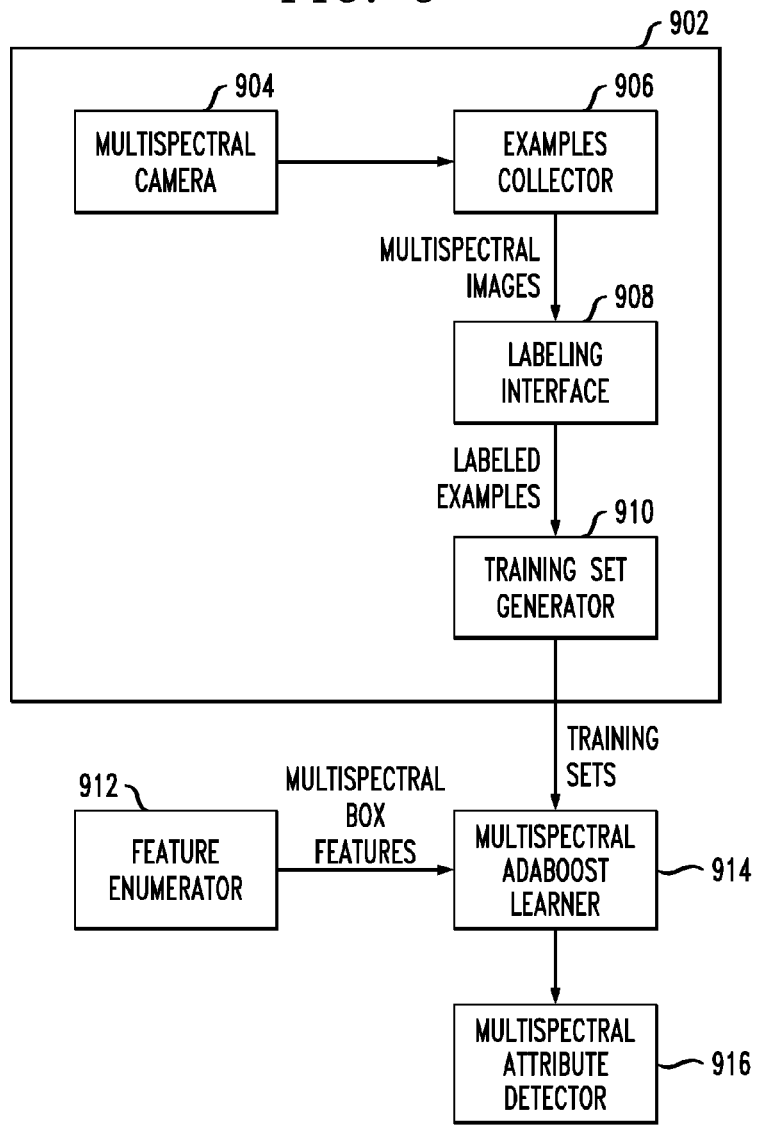
FIG. 9 is a block diagram illustrating an exemplary embodiment, according to an aspect of the invention.

FIG. 9 is a block diagram illustrating an exemplary embodiment, according to an aspect of the invention. By way of illustration, FIG. 9 depicts a system 902 that includes a multispectral camera 904 (FIG. 5, by way of example, depicts on possible embodiment), an examples collector module 906, a labeling interface module 908 and a training set generator module 910. FIG. 9 also depicts a feature enumerator module 912 and a multispectral Adaboost learner module 914.

As depicted in FIG. 9, examples collector module 906 collects video streams taken by the multispectral camera 904 and saves them into multispectral images, which then get sent to the labeling interface module 908. The labeling interface module 908 aids a user into separating the multispectral images into positive and negative examples, and selecting the rectangular regions that correspond to attributes of interest. This information is sent to the training set generator module 910, which produces training sets. Additionally, feature enumerator module 912 generates multispectral box features, and the multispectral box features along with the training sets are sent to a multispectral Adaboost learner module, which generates a multispectral attribute detector 916.

As further detailed herein, the feature enumerator module 912 generates a pool of multispectral box features by exhaustively enumerating combinations of features A-F (for example, as seen in FIG. 7). In one or more embodiments of the invention, the feature enumerator module receives as input the following:

a) the detector size (width×height);

b) the number of spectral bands (d) in the multispectral images (for example, d=2 if the multispectral images include a visible band and an infrared band); and c) $f_{min}$ and $f_{max}$: integers that represent the minimum and maximum width and height of a multispectral box feature.

Inputs (a) and (b) specify a rectangular parallelepiped of size (width×height×d). Given the inputs, the feature enumerator module performs an exhaustive (for example, brute-force) generation of a pool of multispectral box features. In one or more embodiments of the invention, this step is performed as follows:

fixing a feature width $f_w$ and a feature height $f_h$ such that $f_{min} \leq f_w \leq f_{max}$ and $f_{min} \leq f_h \leq f_{max}$;

generating the six feature building blocks A-F (as seen, for example, in FIG. 7) with width=$f_w$ and height $f_h$;

for every location (x,y) in the two-dimensional (2D) space of size (width×height), generating multispectral box features by placing one of the feature building blocks A-F at (x,y) for every level in {1, . . . , d}, and enumerating every possible combination of A-F through the multiple levels {1, . . . , d}; and varying $f_w$ and $f_h$ and repeat until all sizes in [$f_{min}$, $f_{max}$] have been covered.

Generating the multispectral attribute detector (via the Adaboost learner module) can be performed, for example, by known techniques, or techniques analogous thereto. For instance, algorithms for selecting the best features for discrimination can include, for example, the design of a strong classifier based on Adaboost learning, which is obtained by combining one or more weak classifiers. By way of example only, example equations can be found in Viola and Jones, "Robust Real-Time Object Detection," Second International Workshop On Statistical and Computational Theories of Vision—Modeling, Learning, Computing, and Sampling, Canada, July 2001. In one or more embodiments of the invention, when using such example equations, features are replaced by multispectral box features (as described herein).

Further, as detailed herein, a multispectral box feature (an example of which is depicted in FIG. 2) is computed by adding and subtracting pixels (given by white areas for addition and black areas for subtraction) at multiple wavelengths of the image. A multispectral attribute detector is composed of one or more multispectral box features and is used to make a decision on whether or not an area of a multispectral image contains the attribute in question by computing the values of the features it is composed of, computing a weighted sum of such values, and comparing the result to a threshold.

By way of example, in one or more embodiments of the invention, the system 902 can be run for generating the training samples at one machine, while the feature enumerator module 912 and the multispectral Adaboost learner module 914 (corresponding to the training stage) can be run at a different machine, if desired. Further, in one or more embodiments of the invention, all of the depicted modules could be run on the same machine.

Figure 10:
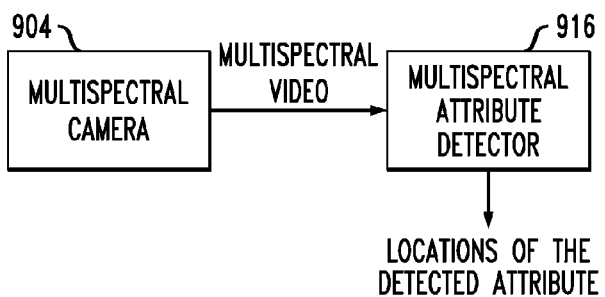
FIG. 10 is a block diagram illustrating an exemplary embodiment, according to an aspect of the invention.

FIG. 10 is a block diagram illustrating an exemplary embodiment, according to an aspect of the invention. By way of illustration, FIG. 10 depicts a multispectral camera 904, which sends multispectral video to a multispectral attribute detector 916 (as illustrated, for example, in FIG. 9). The multispectral attribute detector identifies the location(s) of the detected attributes.

Figure 11:
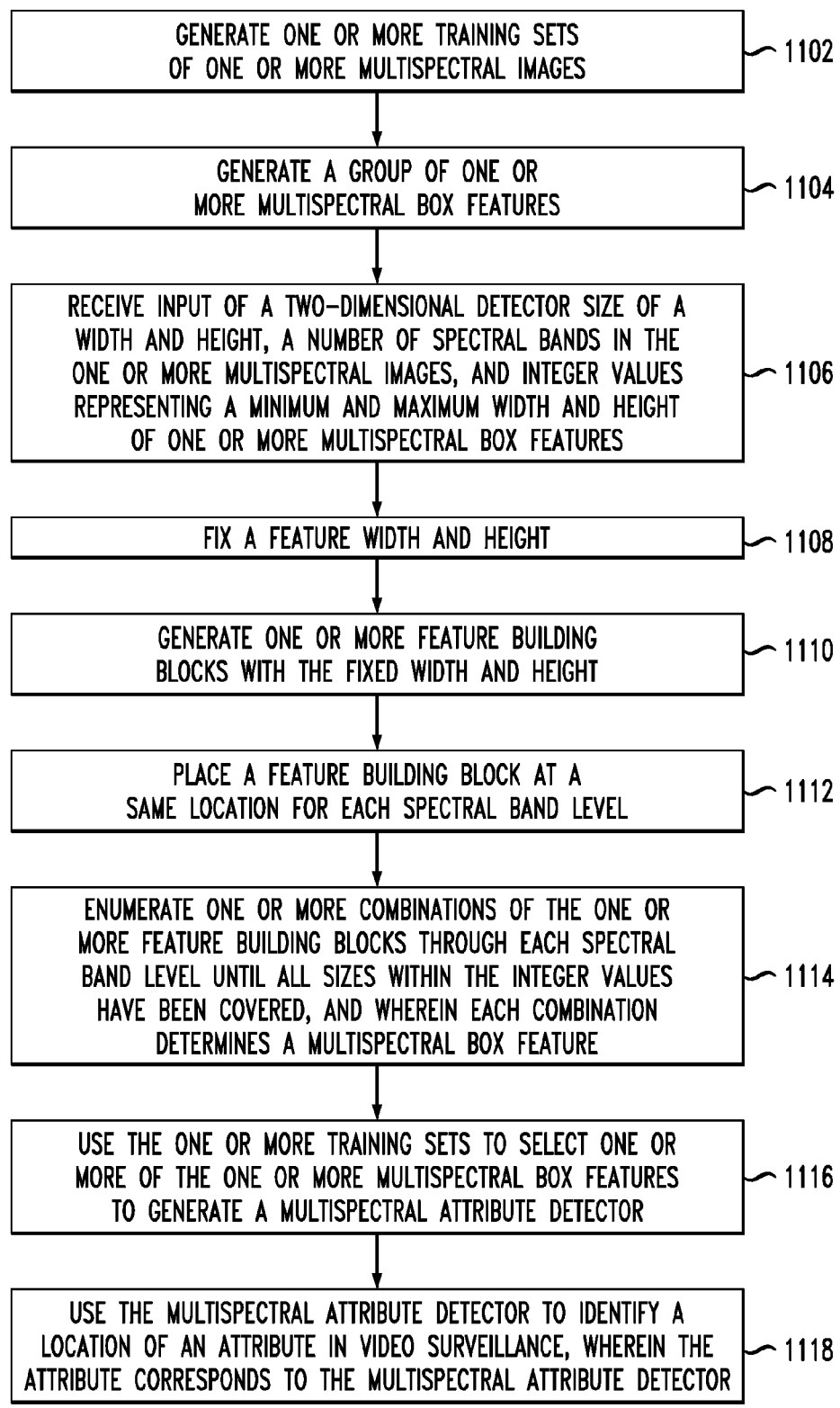
FIG. 11 is a flow diagram illustrating techniques for detecting an attribute in video surveillance, according to an embodiment of the invention.

FIG. 11 is a flow diagram illustrating techniques for detecting an attribute in video surveillance, according to an embodiment of the present invention. Step 1102 includes generating one or more training sets of one or more multispectral images (for example, a thermal infrared image, a visible image, etc.). This step can be carried out, for example, using a training set generator module. An attribute can include, by way of example and not limitation, facial hair type, nose shape, head characteristic (for example, bald, hair, etc.), presence of hat, absence of hat, hairstyle, scar, clothing color, clothing type, eyewear type, etc. Additionally, in one or more embodiments of the invention, the multispectral images are combined into one image before making one combined training set for each attribute. As such, the multispectral box features are computed from pixels at all wavelengths collectively.

Additionally, as used herein, an attribute is an item to be detected by one or more embodiments of the invention, such as, for example, "facial hair type," "eyewear type," etc. A feature is given by the addition and subtraction of pixels in distinct areas at multiple wavelengths of the image.

Step 1104 includes generating a group of one or more multispectral box features. This step can be carried out, for example, using a feature enumerator module. Generating a group of one or more multispectral box features can include steps 1106, 1108, 1110, 1112 and 1114. Step 1106 includes receiving input of a two-dimensional detector size of a width and height, a number of spectral bands in the one or more multispectral images, and integer values representing a minimum and maximum width and height of one or more multispectral box features.

Step 1108 includes fixing a feature width and height. In one or more embodiments of the invention, $f_{min}$ and $f_{max}$ are chosen such that $f_{min} \leq f_{max} \leq$ minimum(detector$_{width}$, detector$_{height}$). By way of illustration, consider the examples depicted in FIG. 7. Take, for example, case "A." The size of the multispectral box feature is the size of the small rectangle that includes the white and the black subrectangles; the larger white rectangle that contains the small rectangle and empty regions is of size equal to the actual detector size. Accordingly, fixing a feature width and height includes, by way of example, fixing the size of the small rectangle to be in the range [$f_{min}$, $f_{max}$]. In one or more embodiments of the invention, this can further be repeated by fixing other values in this range, until the entire range is covered. By way of example and illustration, and not limitation, the large rectangle could be, for instance, of size 20×20, and the small rectangle (multispectral box feature) could be, for instance, of size in the range [5,10].

Step 1110 includes generating one or more feature building blocks with the fixed width and height. Step 1112 includes, for one or more locations in the two-dimensional detector size, placing a feature building block at a same location for each spectral band level.

Further, step 1114 includes enumerating one or more combinations (for example, every combination) of the one or more feature building blocks through each spectral band level until all sizes within the integer values have been covered, and wherein each combination determines a multispectral box feature. In one or more embodiments of the invention, the result of this enumeration step is a collection of multispectral box features. Each possible combination determines a different multispectral box feature. This exhaustive process covers variations in size of the multispectral box feature, combinations of building blocks A-F across multiple wavelengths, location of the multispectral box feature within the detector region (the location of the "small rectangle" within the "large rectangle," as used as an example above), etc.

A multispectral box feature can include, for example, a sum of pixel values along one or more regions in a three-dimensional space given by one or more captured images. Each region may have a positive or a negative sign, meaning that the pixel values in that region are either added or subtracted. Consider, by way of example, the multispectral box feature depicted in FIG. 2. It comprises the region given by the cube, and white areas correspond to "add pixels" while black areas correspond to "subtract pixels." If there were only two wavelengths, the pixels in the first wavelength (for example, visible) would be added, as they are in a white area, and the pixels in the second wavelength (for example, infrared) would be subtracted, as they are in a black area. The sum of all pixel values in the white area minus the sum of all pixel values in the black area gives the value of this multispectral box feature. Other variations of multispectral box features are possible by combining the elements A-F, such as depicted, for example, in FIG. 7.

Generating training sets of multispectral images can include, for a given attribute for which a detector is to be trained, using a desired detector size (for example, in pixels) as input. Additionally, generating training sets of multispectral images can include generating a positive training set, wherein generating a positive training set includes collecting multispectral images of a given attribute for which a detector is to be trained, selecting (for example, manually) rectangular regions in the multispectral images that correspond to the attribute, and resealing the selected regions to correspond to a desired detector size. Further, collecting multispectral images of a given attribute for which a detector is to be trained can include simultaneously capturing multiple images of a scene from one point of view, wherein each image corresponds to a different portion of an electromagnetic spectrum.

Also, in one or more embodiments of the invention, generating training sets of multispectral images can include generating a negative training set, wherein generating a negative training set includes collecting multispectral images that do not contain a given attribute for which a detector is to be trained, and randomly sampling portions of the multispectral images of a size correspond to a desired detector size.

Step 1116 includes using the one or more training sets to select one or more of the one or more multispectral box features to generate a multispectral attribute detector. This step can be carried out, for example, using a multispectral Adaboost learner module. Using the training sets to select one or more of the multispectral box features to generate a multispectral attribute detector can include using adaptive boosting learning.

Additionally, in one or more embodiments of the invention, using the training sets to select one or more multispectral box features to generate a multispectral attribute detector includes using a positive training set, a negative training set and the group of multispectral box features as input. Further, an algorithm can be used to select one or more features for discrimination between items from the positive training set and negative training set.

Step 1118 includes using the multispectral attribute detector to identify a location of an attribute in video surveillance, wherein the attribute corresponds to the multispectral attribute detector. Using the multispectral attribute detector to identify a location of an attribute in video surveillance can include using a multispectral image to be classified and the multispectral attribute detector as input. Also, for every location and scale of the multispectral image, one or more embodiments of the invention include applying the multispectral attribute detector to identify the attribute in each spectra of the multispectral image.

The techniques depicted in FIG. 11 additionally include classifying one or more new multispectral images. Also, one or more embodiments of the invention include combining features in the visible domain with features in one or more additional wavelengths to design a fine-grained attribute detector.

Further, the techniques depicted in FIG. 11 can also include using adaptive boosting learning to assemble one or more weak classifiers into one single strong classifier. Assembling one or more weak classifiers into one single strong classifier can include, for example, initializing one or more sample weights and, for each cycle, identifying a classifier that performs on a weighted sample and increasing weights of misclassified examples.

The techniques depicted in FIG. 11 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include an examples collector module, a labeling interface module, a training set generator module, a feature enumerator module and a multispectral Adaboost learner module that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 11 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 12:
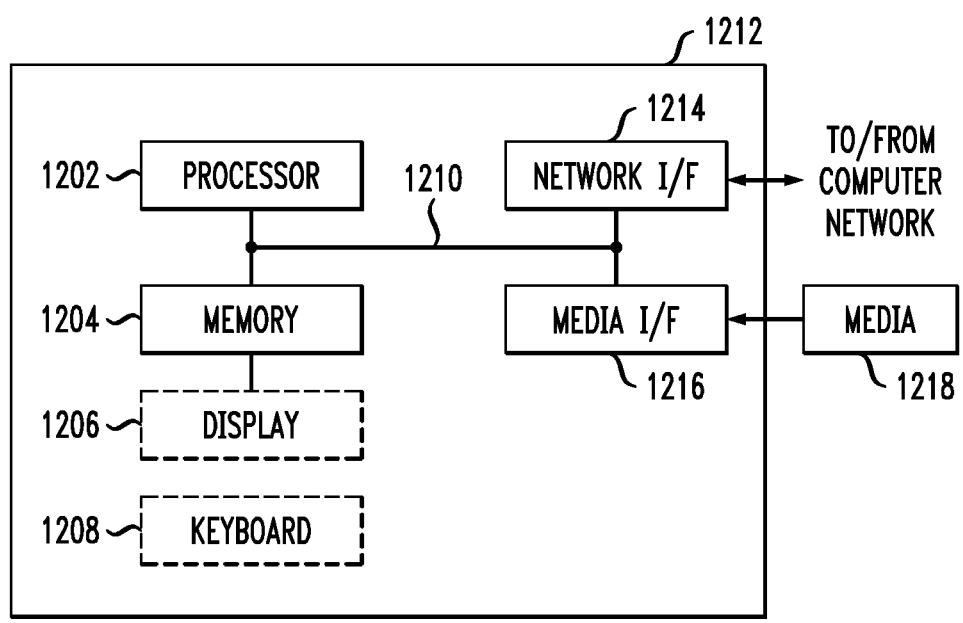
FIG. 12 is a system diagram of an exemplary computer system on which at least one embodiment of the invention can be implemented.

One or more embodiments can make use of software running on a general purpose computer or workstation. With reference to FIG. 12, such an implementation might employ, for example, a processor 1202, a memory 1204, and an input/output interface formed, for example, by a display 1206 and a keyboard 1208. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1202, memory 1204, and input/output interface such as display 1206 and keyboard 1208 can be interconnected, for example, via bus 1210 as part of a data processing unit 1212. Suitable interconnections, for example via bus 1210, can also be provided to a network interface 1214, such as a network card, which can be provided to interface with a computer network, and to a media interface 1216, such as a diskette or CD-ROM drive, which can be provided to interface with media 1218.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1202 coupled directly or indirectly to memory elements 1204 through a system bus 1210. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1208, displays 1206, pointing devices, and the like) can be coupled to the system either directly (such as via bus 1210) or through intervening I/O controllers (omitted for clarity).

Network adapters such as network interface 1214 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1212 as shown in FIG. 12) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1218 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, programmable apparatus or other devices to produce a computer implemented process such that the instructions which execute on the computer or other programmable apparatus provide processes for implementing the functions/acts specified in the flowchart and/or diagrams herein.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 5, FIG. 6, FIG. 8 and FIG. 9. The method steps can then be carried out using the distinct software modules and/or sub-modules of the system, as described above, executing on one or more hardware processors 1202. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, using multi-spectral box features to detect fine-grained personal attributes in surveillance videos, wherein such features combine information extracted from images across multiple wavelengths, collected simultaneously from the same point of view.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for detecting an attribute in video surveillance, the method comprising:

generating one or more training sets of one or more multispectral images; generating a group of one or more multispectral box features, wherein generating a group of one or more multispectral box features comprises the steps of:

receiving input of a two-dimensional detector size of a width and height, a number of spectral bands in the one or more multispectral images, and integer values representing a minimum and maximum width and height of one or more multispectral box features;

fixing a feature width and height; generating one or more feature building blocks with the fixed width and height; for one or more locations in the two-dimensional detector size, placing a feature building block at a same location for each spectral band level; and enumerating one or more combinations of the one or more feature building blocks through each spectral band level until all sizes within the integer values have been covered, and wherein each combination determines a multispectral box feature;

using the one or more training sets to select one or more of the one or more multispectral box features to generate a multispectral attribute detector; and using the multispectral attribute detector to identify a location of an attribute in video surveillance, wherein using the multispectral attribute detector to identify a location of an attribute in video surveillance comprises, for one or more locations on each spectral band level of the multispectral image, applying the multispectral attribute detector and producing an output indicating attribute detection or an output indicating no attribute detection, and wherein the attribute corresponds to the multispectral attribute detector; wherein generating one or more training sets of one or more multispectral images comprises generating a positive training set, wherein generating a positive training set comprises:

collecting one or more multispectral images of a given attribute for which a detector is to be trained;

selecting one or more rectangular regions in the one or more multispectral images that correspond to the attribute; and rescaling the one or more selected regions to correspond to a desired detector size.

2. The method of claim 1, wherein the one or more multispectral images comprise at least one of a thermal infrared image and a visible image.

3. The method of claim 1, wherein an attribute comprises at least one of facial hair type, nose shape, head characteristic, presence of hat, absence of hat, hairstyle, scar, clothing color, clothing type, and eyewear type.

4. The method of claim 1, wherein generating one or more training sets of one or more multispectral images comprises, for a given attribute for which a detector is to be trained, using a desired detector size as input.

5. The method of claim 1, wherein collecting one or more multispectral images of a given attribute for which a detector is to be trained comprises simultaneously capturing multiple images of a scene from one point of view, wherein each image corresponds to a different portion of an electromagnetic spectrum.

6. The method of claim 1, wherein generating one or more training sets of one or more multispectral images comprises generating a negative training set, wherein generating a negative training set comprises:
collecting one or more multispectral images that do not contain a given attribute for which a detector is to be trained; and
randomly sampling portions of the one or more multispectral images of a size that corresponds to a desired detector size.

7. The method of claim 1, wherein a multispectral box feature comprises a sum of one or more pixel values along one or more regions in a three-dimensional space given by one or more captured images.

8. The method of claim 1, wherein using the one or more training sets to select one or more of the one or more multispectral box features to generate a multispectral attribute detector comprises using adaptive boosting learning.

9. The method of claim 1, wherein using the one or more training sets to select one or more of the one or more multispectral box features to generate a multispectral attribute detector comprises using a positive training set, a negative training set and the group of multispectral box features as input.

10. The method of claim 9, wherein using the one or more training sets to select one or more of the one or more multispectral box features to generate a multispectral attribute detector comprises using an algorithm to select one or more features for discrimination between items from the positive training set and negative training set.

11. The method of claim 1, wherein using the multispectral attribute detector to identify a location of an attribute in video surveillance comprises using a multispectral image to be classified and the multispectral attribute detector as input.

12. The method of claim 11, wherein for every location and scale of the multispectral image, applying the multispectral attribute detector to identify the attribute in each spectra of the multispectral image.

13. The method of claim 1, further comprising classifying one or more new multispectral images.

14. The method of claim 1, further comprising using adaptive boosting learning to assemble one or more weak classifiers into one single strong classifier.

15. The method of claim 14, wherein assembling one or more weak classifiers into one single strong classifier comprises initializing one or more sample weights and, for each cycle, identifying a classifier that performs on a weighted sample and increasing weights of one or more misclassified examples.

16. The method of claim 1, further comprising providing a system, wherein the system comprises one or more distinct software modules, each of the one or more distinct software modules being embodied on a tangible computer-readable recordable storage medium, and wherein the one or more distinct software modules comprise an examples collector module, a labeling interface module, a training set generator module, a feature enumerator module and a multispectral Adaboost learner module executing on a hardware processor.

17. A tangible computer device includes a computer useable program code for detecting an attribute in video surveillance, the computer device including:
computer useable program code for generating one or more training sets of one or more multispectral images;
computer useable program code for generating a group of one or more multispectral box features, wherein the computer useable program code for generating a group of one or more multispectral box features comprises:
computer useable program code for receiving input of a two-dimensional detector size of a width and height, a number of spectral bands in the one or more multispectral images, and integer values representing a minimum and maximum width and height of one or more multispectral box features; computer useable program code for fixing a feature width and height; computer useable program code for generating one or more feature building blocks with the fixed width and height; computer useable program code for placing a feature building block at a same location for each spectral band level for one or more locations in the two-dimensional detector size; and computer useable program code for enumerating one or more combinations of the one or more feature building blocks through each spectral band level until all sizes within the integer values have been covered, and wherein each combination determines a multispectral box feature; computer useable program code for using the one or more training sets to select one or more of the one or more multispectral box features to generate a multispectral attribute detector; and computer useable program code for using the multispectral attribute detector to identify a location of an attribute in video surveillance, wherein using the multispectral attribute detector to identify a location of an attribute in video surveillance comprises, for one or more locations on each spectral band level of the multispectral image, applying the multispectral attribute detector and producing an output indicating attribute detection or an output indicating no attribute detection, and wherein the attribute corresponds to the multispectral attribute detector; wherein the computer useable program code for generating one or more training sets of one or more multispectral images comprises computer useable program code for generating a positive training set, and wherein the computer useable program code for generating a positive training set further comprises: computer useable program code for collecting one or more multispectral images of a given attribute for which a detector is to be trained; and selecting one or more rectangular regions in the one or more multispectral images that correspond to the attribute; and resealing the one or more selected regions to correspond to a desired detector size.

18. The computer device of claim 17, wherein the computer useable program code for generating one or more training sets of one or more multispectral images comprises computer useable program code for generating a negative training set, and where the computer useable program code for generating a negative training set further comprises:
computer useable program code for collecting one or more multispectral images that do not contain a given attribute for which a detector is to be trained; and computer useable program code for randomly sampling portions of the one or more multispectral images of a size that corresponds to a desired detector size.

19. The computer device of claim 17, wherein the computer useable program code for using the one or more training sets to select one or more of the one or more multispectral box features to generate a multispectral attribute detector comprises computer useable program code for using a positive training set, a negative training set and the group of multispectral box features as input.

20. A system for detecting an attribute in video surveillance, comprising: a memory; and at least one processor coupled to the memory and operative to: generate one or more training sets of one or more multispectral images; generate a group of one or more multispectral box features, wherein generating a group of one or more multispectral box features comprises: receiving input of a two-dimensional detector size of a width and height, a number of spectral bands in the one or more multispectral images, and integer values representing a minimum and maximum width and height of one or more multispectral box features; fixing a feature width and height; generating one or more feature building blocks with the fixed width and height; for one or more locations in the two-dimensional detector size, placing a feature building block at a same location for each spectral band level; and enumerating one or more combinations of the one or more feature building blocks through each spectral band level until all sizes within the integer values have been covered, and wherein each combination determines a multispectral box feature; use the one or more training sets to select one or more of the one or more multispectral box features to generate a multispectral attribute detector; and use the multispectral attribute detector to identify a location of an attribute in video surveillance, wherein using the multispectral attribute detector to identify a location of an attribute in video surveillance comprises, for one or more locations on each spectral band level of the multispectral image, applying the multispectral attribute detector and producing an output indicating attribute detection or an output indicating no attribute detection, and wherein the attribute corresponds to the multispectral attribute detector; wherein at least one processor coupled to the memory operative to generate the one or more training sets of one or more multispectral images is further operative to generate a positive training set, and collect one or more multispectral images of a given attribute for which a detector is to be trained;

select one or more rectangular regions in the one or more multispectral images that correspond to the attribute; and rescale the one or more selected regions to correspond to a desired detector size.

21. The system of claim 20, wherein the at least one processor coupled to the memory operative to generate one or more training sets of one or more multispectral images is further operative to generate a negative training set, and wherein the at least one processor coupled to the memory operative to generate a negative training set is further operative to:

collect one or more multispectral images that do not contain a given attribute for which a detector is to be trained; and randomly sample portions of the one or more multispectral images of a size that corresponds to a desired detector size.

22. An apparatus for detecting an attribute in video surveillance, the apparatus comprising:

means for generating one or more training sets of one or more multispectral images;

means for generating a group of one or more multispectral box features, wherein means generating a group of one or more multispectral box features comprises:

means for receiving input of a two-dimensional detector size of a width and height, a number of spectral bands in the one or more multispectral images, and integer values representing a minimum and maximum width and height of one or more multispectral box features;

means for fixing a feature width and height;

means for generating one or more feature building blocks with the fixed width and height;

means for placing a feature building block at a same location for each spectral band level for one or more locations in the two-dimensional detector size; and means for enumerating one or more combinations of the one or more feature building blocks through each spectral band level until all sizes within the integer values have been covered, and wherein each combination determines a multispectral box feature;

means for using the one or more training sets to select one or more of the one or more multispectral box features to generate a multispectral attribute detector; and means for using the multispectral attribute detector to identify a location of an attribute in video surveillance, wherein using the multispectral attribute detector to identify a location of an attribute in video surveillance comprises, for one or more locations on each spectral band level of the multispectral image, applying the multispectral attribute detector and producing an output indicating attribute detection or an output indicating no attribute detection, and wherein the attribute corresponds to the multispectral attribute detector; wherein generating one or more training sets of one or more multispectral images comprises generating a positive training set, wherein generating a positive training set comprises:

collecting one or more multispectral images of a given attribute for which a detector is to be trained;

selecting one or more rectangular regions in the one or more multispectral images that correspond to the attribute; and rescaling the one or more selected regions to correspond to a desired detector size.

* * * * *